United States Patent [19]

Suillerot et al.

[11] Patent Number: 4,765,709

[45] Date of Patent: Aug. 23, 1988

[54] EQUIPMENT FOR DISTRIBUTING AND CONNECTING OPTICAL FIBERS

[76] Inventors: Didier Suillerot; Robert Violo, both of 41, rue Cantagrel, 75631 Paris Cedex 13, France

[21] Appl. No.: 48,780

[22] Filed: May 12, 1987

[30] Foreign Application Priority Data

May 16, 1986 [FR] France ................................ 86 07059

[51] Int. Cl.⁴ ................................................ G02B 6/36
[52] U.S. Cl. .............................. 350/96.20; 350/96.21; 350/96.22
[58] Field of Search ............... 350/96.20, 96.21, 96.22, 350/96.23; 250/227

[56] References Cited

U.S. PATENT DOCUMENTS

| | | | |
|---|---|---|---|
| 4,319,951 | 3/1982 | Korbelak et al. | 350/96.22 X |
| 4,332,435 | 6/1982 | Post | 350/96.20 |
| 4,666,240 | 5/1987 | Caron et al. | 350/96.20 |
| 4,673,246 | 6/1987 | Schembri | 350/96.22 X |
| 4,685,764 | 8/1987 | Hoffer et al. | 350/96.20 |
| 4,697,873 | 10/1987 | Bouvard et al. | 350/96.23 |
| 4,697,874 | 10/1987 | Nozick | 350/96.22 |
| 4,702,551 | 10/1987 | Coulombe | 350/96.22 |
| 4,717,231 | 1/1988 | Dewez et al. | 350/96.20 |
| 4,730,893 | 3/1988 | Burmeister | 350/96.22 |

FOREIGN PATENT DOCUMENTS

| | | | |
|---|---|---|---|
| 2515466 | 4/1983 | France | 350/96.20 |
| 2538918 | 7/1984 | France | 350/96.20 |
| 2570196 | 3/1986 | France | 350/96.20 |
| 58-169114 | 10/1983 | Japan | 350/96.20 |

Primary Examiner—William L. Sikes
Assistant Examiner—Brian M. Healy
Attorney, Agent, or Firm—Laubscher & Laubscher

[57] ABSTRACT

An optical fiber distributing and connecting equipment is in the form of a box in which first optical fibers fanned-out from first cables are connected to second optical fibers fanned-out from second cables by means of fiber-to-fiber connectors. In order to achieve easy mixing of the second fibers while ensuring that their lengths remain substantially equal, the connectors are laid out in a circular region. This region includes one or more circular, coaxial and possibly stacked slides, on which the connectors are slidably mounted. Ends of the first fibers are inserted in first ends of the connectors located on the outer edge of the slides, and the ends of the second fibers are deployed radially from the central axis of the slides and inserted in the second ends of the connectors located on the inner edge of the slides. A central hole in a disk coaxial with the slides groups together the second fibers close to the central axis of the slides. Holes spread around the periphery of the disk group the first fibers into bundles around the central axis.

17 Claims, 7 Drawing Sheets

EQUIPMENT FOR DISTRIBUTING AND CONNECTING OPTICAL FIBERS

BACKGROUND OF THE INVENTION

1—Field of the Invention

The present invention relates to an equipment for distributing and connecting first optical fibers emerging from first cables to second optical fibers emerging from second cables respectively, by means of connectors. Each connector connects an end of a respective first fiber to an end of a respective second fiber. The invention in particular deals with an equipment in the form of a box or a cabinet inside which the fibers can be mixed in order to alter the connections between the first and second optical fibers.

2—Description of the Prior Art

In such an equipment, the fiber-to-fiber connectors are generally in the form of small flat or cylindrical cases disposed side by side in a straight row and attached to a support such as the base of the box. The ends of the first fibers are inserted into the connectors on one side of the row of connectors, and the ends of the second fibers are inserted into the connectors through the other side of the row. In general, the fibers are coiled into spare loops after they emerge from the cables and before they are inserted into the connectors. The spare loops of the first and second fibers are either placed on either side of the connector row, between the parallel end-walls of the box through which the cables pass via grommets, or laterally in relation to the row of connectors. A spare loop constitutes a reserve fiber length should an incident arise requiring recutting of an end portion of the fiber.

In any case, the fibers are inserted perpendicular to the row of connectors and they are therefore parallel to each other in the connectors. Since the first fibers, respectively the second fibers, follow substantially the same path in the equipment between the sheathed ends of the cables and the row of connectors, it is necessary to provide different lengths of the fibers before insertion into their respective connectors, so that the fiber length is sufficient for it to reach the connector into which it is to be inserted. This difference in length is all the more pronounced as the number of connectors, possibly up to 100 or 200, increases. If such an arrangement is not made when preparing the fibers, for example if all the fibers are cut to a length such that any fiber can be inserted in the connector farthest from the point at which the fiber bundle fans out in the direction of the connectors, the fibers inserted into the closest connectors to the point at which the bundle fans out will be excessively long causing tangling of the fibers and a risk of fiber cracking and breaking.

These drawbacks can occur again when one wishes to modify the connections between the first and second fibers. For example, and as is generally the case in practice, the first fibers are allocated once and for all to predetermined connectors, and second fibers can be inserted in the remaining available connectors or interchanged with other second fibers depending on operational needs. It is clear that the operation to extract a fiber from a connector located at one end of the row and insert it into another connector at the other end of the row is cumbersome and necessitates moving the other fibers with all the attendant risks of tangling and damage in order to provide access to the two connectors.

OBJECTS OF THE INVENTION

The main object of this invention is to remedy the above mentioned drawbacks.

More particularly, this invention allows easy mixing of the second fibers by ensuring that their lengths are kept practically equal.

SUMMARY OF THE INVENTION

Accordingly, there is provided an equipment for distributing and connecting first optical fibers emerging from first cables to second optical fibers emerging from second cables by mesns of plural optical fiber connectors respectively. Each of the connectors connects an end of a respective first fiber to an end of a respective second fiber. The connectors are located in a circular region. The ends of the first optical fibers are respectively inserted in first ends of the connectors located on the outer edge of the circular region. The ends of the second optical fibers are deployed radially from the central axis of the circular region and are respectively inserted in second ends of connectors located on the inner edge of the circular region.

The second fibers are thus grouped in the center of the circular region, which can be formed by one or more concentric arcs of a circle and/or circles, preferably stacked, and along which the connectors are distributed. This circular distribution of the connectors allows introduction of any second fiber end in any second connector end without modifying the length of the second fiber or curving it more than is necessary. In order to extract a second fiber from a connector and insert it into another connector, it is only necessary to move across the sector separating the two connectors, with the end of the second fiber rotating around the central axis of the circular region. The second fibers are preferably grouped by means of a disk coaxial with the arc of a circle through which the second fibers pass.

According to another feature of this invention, the circular region is defined by at least one circular slide on which the connectors are slidably mounted. The sliding of the connectors allows a suitable access space to be made around a connector when inserting the end of a fiber in the connector.

In practice, when the connection capacity of the equipment is high, two or three stacked coaxial circular slides are provided for. Access to the connectors on the lower slides is made easier by laying out the slides along arcs of circles forming all or part of parallel transverse sections of a cone frustum or a spherical cap.

BRIEF DESCRIPTION OF THE DRAWING

Further features and advantages of the invention will be apparent from the following particular description of several preferred embodiments of this invention as illustrated in the corresponding accompanying drawings in which.

DESCRIPTION OF THE PREFERRED EMBODIMENTS

For production of equipments described hereinafter, reference is made to known optical fiber cables having the following characteristics.

An elementary cable, itself capable of constituting an independent cable, or a sub-cable of a multiple cable containing several sub-cables, comprises a core in the form of a split-ring having an elongated cylindrical structure made of extruded thermoplastic. The ring encloses a steel strengthening carrier armature. parallel helical grooves are regularly spaced around the periphery of the ring. Each groove contains one or more optical fibers which can be buried in grease to protect them against humidity. In the following examples, the ring of an elementary cable comprises ten grooves, and each of the grooves contains one or three optical fibers. An elementary cable thus comprises 10 optical fibers, or $3 \times 10 = 30$ optical fibers.

The optical fibers have for example a core diameter of 50 $\mu$m and a cladding diameter of 125 $\mu$m. In order to protect each optical fiber during coiling and connection, and in particular to make it easier to grasp each fiber when it exits a groove on the ring containing grease, each optical fiber emerging from an unsheathed end of a cable is freely guided in a protective elastomer jacket having an inside diameter of 850 $\mu$m and an outside diameter of 1450 $\mu$m.

In order to fix the ideas, there follows a detailed description of an embodiment of an optical fiber distribution and connection equipment having a maximum capacity of 210 optical fibers, that is, designed to connect respectively 210 first optical fibers Fe in first cables, called incoming cables Ce, to 210 second optical fibers Fs of second cables, called outgoing cables Cs. According to the embodiment illustrated in FIGS. 1 and 2, the equipment connects optical fibers in an incoming multiple cable MCe comprising 7 sub-cables Ce, each of the sub-cables including a ring containing three optical fibers per groove, to optical fibers in one outgoing multiple cable MCs comprising three sub-cables Cs and in two outgoing multiple cables MCs each comprising two sub-cables Cs. The incoming and outgoing sub-cables are identical and each comprise thirty optical fibers.

Figure 1:
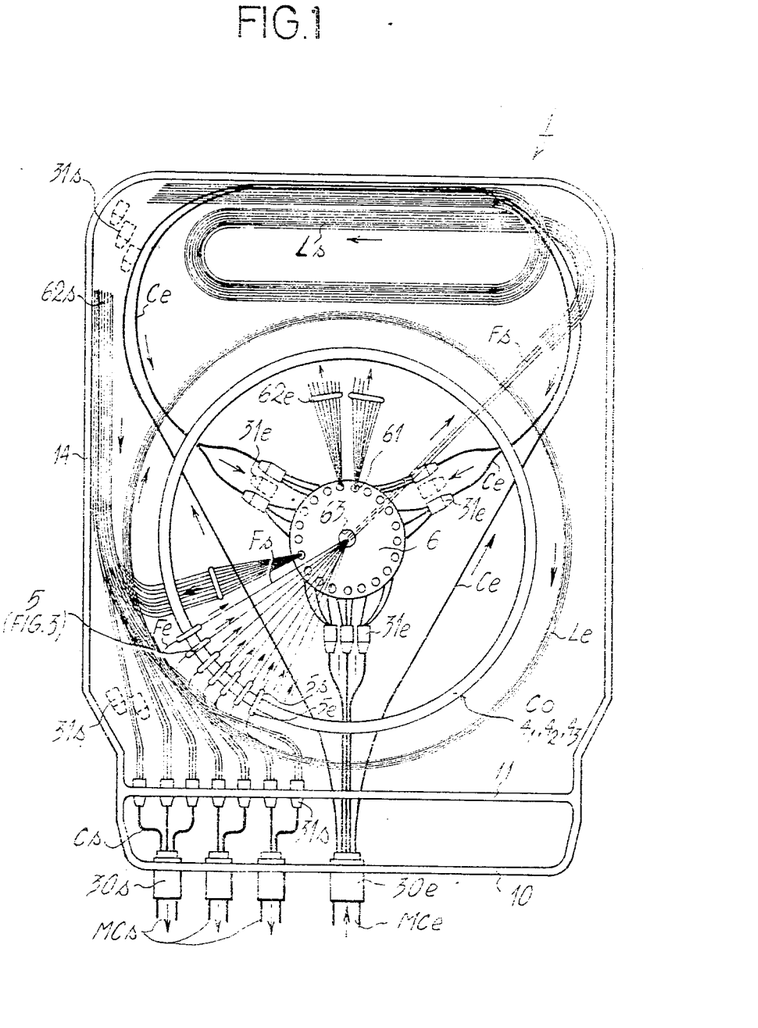
FIG. 1 is a schematic top view of a high-capacity distribution and connection equipment in accordance with a first embodiment, with the an cover of the equipment being removed.

The equipment is in the form of a cabinet comprising a parallelepipedal box 1 and a lid 2 put on the box. The lid snaps on the box to form a leaktight seal or includes other similar means of closure. As shown in FIG. 1, box 1 has a double-wall 10-11 on a lateral side. One, 11, of the two walls may be a partition insertable or not on the bottom of the box, or one, 10, of the two walls located on the outside may be flange attached to the box.

The outer wall 10 includes orifices in which are introduced known grommets 30e and 30s, such as rubber or plastic sleeves, gripping the sheathed ends of multiple cables MCe and MCs respectively in order to make the seals between the multiple cables and the box leaktight. In the space marked out by walls 10 and 11, sub-csbles Ce and Cs emerge from the grommets 30s and 30e with the multiple cable sheathings removed. Incoming sub-cables Ce form a bundle crossing through a central orifice in inner wall 11, whereas unsheathed ends, with cut ring and armature, of outgoing sub-cables Cs are attached to wall 11 by seven optical fiber spreading devices 31s laid side by side in a horizontal row. The spreading devices are preferably of the type described in U.S. patent application Ser. No. 38,005 filed on Apr. 14, 1987 and claiming the priority of French patent application No. 86-05523 filed on Apr. 17, 1986. A spreading device 31s is made of metal or partly of plastic and is used to fan-out the optical fibers emerging from the ten grooves of the cut cylindrical core ring of an outgoing sub-cable Cs and to join this sub-cable to individual protective jackets into which the outgoing fibers have been inserted. In addition, the spreading device joins the strenghtening central armature of sub-cable Cs to box 1 via a member gripping the armature. Thus, as shown in FIGS. 1 and 2, the outer wall 10 acts as a grommet supporting plate, and inner wall 11 acts ss a spreading device supporting plate.

As particularly shown in FIG. 1, box 1 offers an annular connection region CO and a rectangular coiling region Ls where the outgoing fibers Fs are coiled. The regions CO and Ls are located along a longitudinal axis between wall 11 and an opposite sidewall 12. On the one hand, connection region CO houses spreading devices 31e for the optical fibers Fe emerging from unsheathed ends, with sawn ring, of the incoming sub-cables Ce. On the other hand, region CO contains the grouped ends of optical fibers Fs coming from fiber-to-fiber connectors 5. Outside and concentric with the connection region CO, the incoming fibers Fe are coiled in a circular coiling region Le. In the equipment , the radius of all the curves to which the cables, rings and fibers are submitted are greater than the minimum curve radius, about 5 cm, which an optical fiber can be subjected to without altering its physical characteristics.

Figure 2:
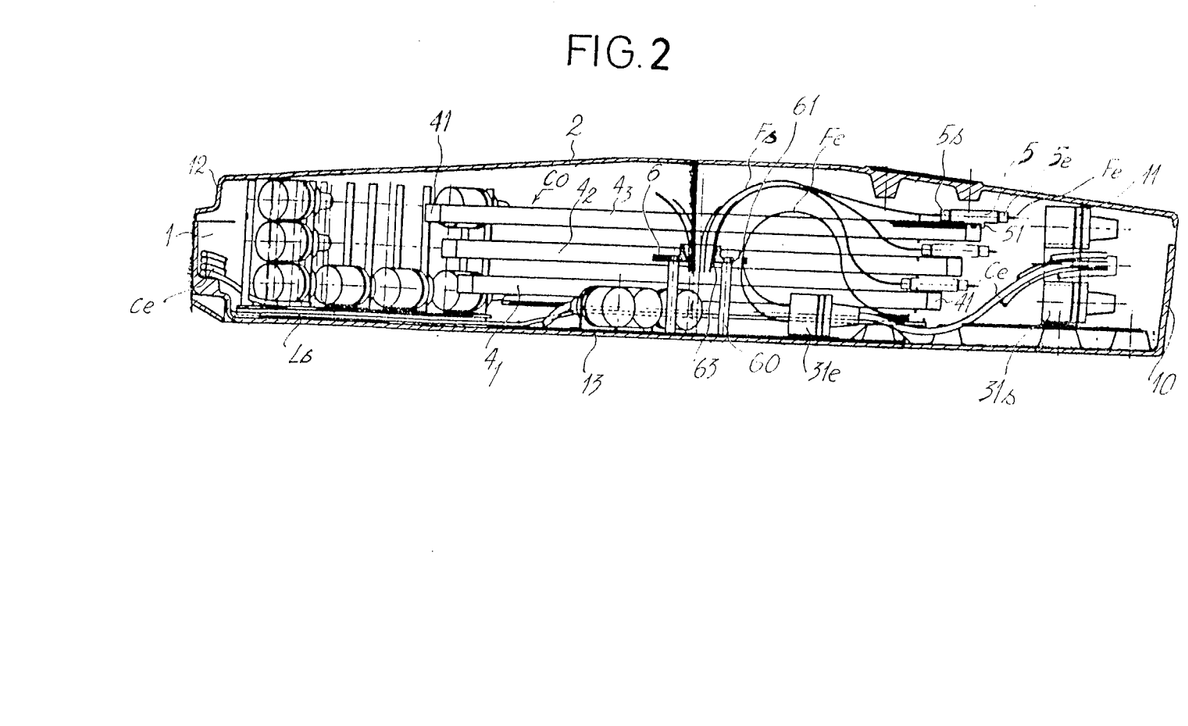
FIG. 2 is a longitudinal cross-sectional view of the equipment of FIG. 1.

In the embodiment illustrated in FIG. 2, connection region CO comprises three concentric rings $4_1$, $4_2$ and $4_3$. The three rings are stacked above the bottom 13 of box 1 and their diameters preferably increase from the bottom upwards in order to facilitate the access and visibility of lower rings $4_1$ and $4_2$ from the inside. The rings thus form a frustum or spherical cap shaped envelope flared out in the direction of lid 2. The rings are fixed to bottom 13 by columns 18 tilted in relation to the vertical, as shown in the example in FIG. 13.

Figure 3:
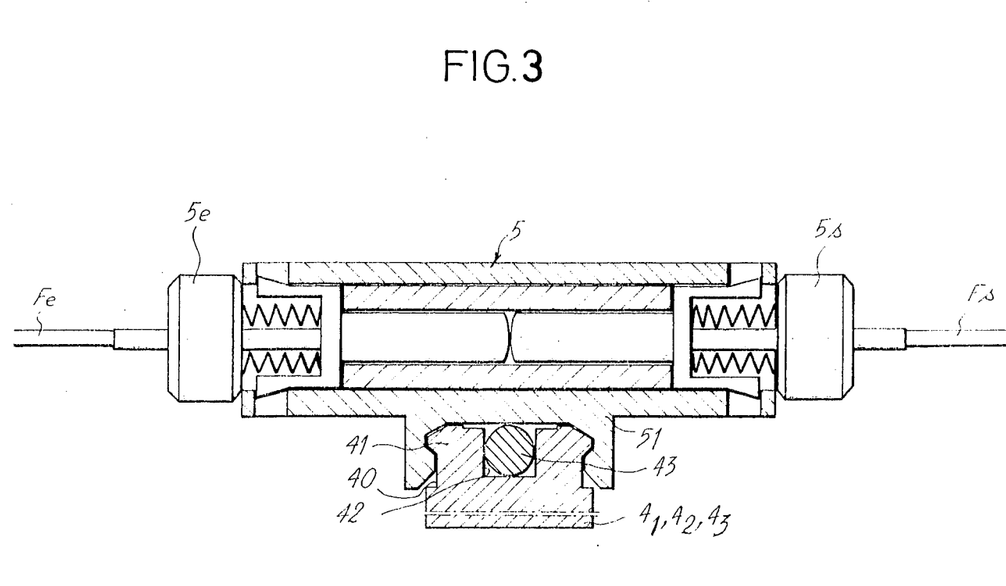
FIG. 3 is a transverse cross-section of a ring of the equipment supporting a sliding fiber connector.

As shown in FIG. 3, each of the rings $4_1$, $4_2$ and $4_3$ has a rectangular radial cross-section and has two lateral concentric grooves 40 on its upper portion in order to create a circular slide 41 of the male dovetail or T-section type. Fiber-to-fiber connectors 5 have female dovetail or inverted U-section type bases 51 as shown in FIG. 3, and are slidably mounted on slide 41. Above the base 51, each connector 5 has a known longitudinal means, such as first and second V-grooved end-pieces 5e and 5s slipped into a longitudinal passage, to align and abutting the unsheathed ends of an incoming optical fiber Fe and an outgoing optical fiber Fs. As shown in FIGS. 1 and 2, a connector 5 is placed crosswise to the ring so as to align the two ends of fibers Fe and Fs to be connected, radially to the ring. The end of incoming fiber Fe is inserted in the connector through the outside of the ring, and the end of outgoing fiber Fs is inserted in the connector through the inside of the ring. In particular, the connectors comprise means for joining an end of the individual protective jacket for each fiber to the body of the connector. There is a circular rectangular groove 42 in the center of slide 41 to receive an elastic rubber ring 43. Ring 43 has a diameter equal to the width of groove 42 but substantially less than the height of groove 42, so that the ring brakes connectors 51 by contact under bases 5 and tends to distance the bases from slide 41 so as to immobilize the connectors in the positions chosen on the ring. The rings are made of metal, such as anodized aluminium or stainless steel, or plastic, and the connectors are made of plastic or stainless steel.

Figure 4:
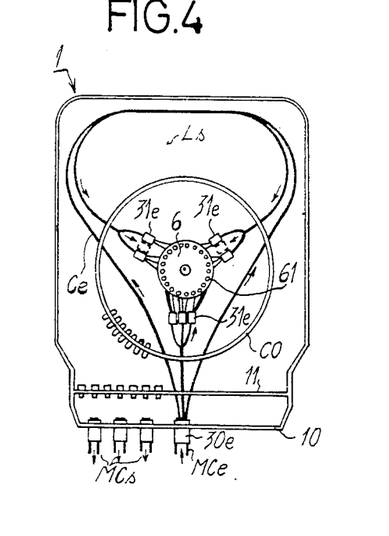
FIG. 4 is a hematic view analogous to FIG. 1, showing paths of incoming fiber sub-cables.
Figure 5:
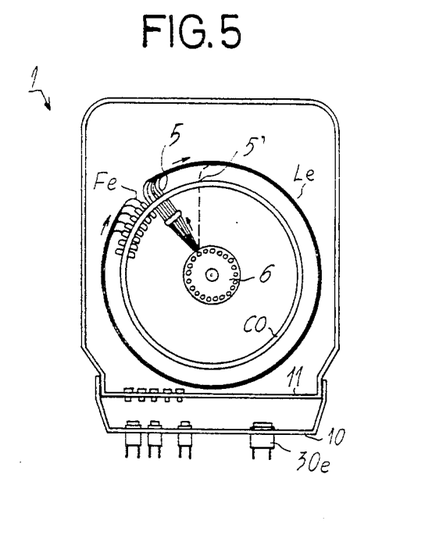
FIG. 5 is a schematic view similar to FIG. 1, and shows coiled loops of incoming fiber with release of the length of and incoming fiber in the event of an incident.

FIGS. 4 and 5 show schematically the various routing operations for incoming fibers Fe in box 1. from grommets 30e in the direction of the ends 5e of connectors 5 oriented towards the outside of connection region CO. The seven sub-cables Ce emerging from the central orifice in the inner wall 11 are routed to the seven spreading devices equipments 31e located inside region CO, and passing under the assembly of the rings $4_1$, $4_2$ and $4_3$. Three sub-cables Ce extend along the longitudinal axis of the box as far as a group of three spreading devices also housed along this axis, between region CO and its center. Two pairs of sub-cables Ce diverge along the arms of a Y from wall 11, pass under connection region CO and bypass coiling region Ls in opposite directions to come together again inside region CO where there are two pairs of spreading devices 31e that are substantially equidistributed with the other group of three spreading devices, around the center of region CO. The spreading devices 31e are identical to the spreading devices 31s.

As shown in detail in FIGS. 1 and 2, a distribution disk 6 is housed in the center of connection region CO. Disk 6 is fixed parallel to the bottom 13 of box 1 by vertical pillars 60 and is located appreciably at mid-height of the set of rings, here at the level of intermediate ring $4_2$. The diameter of disk 6 is considerably less than that of the rings, typically in a ratio of about 1/5 to 1/6, so that the fibers Fe emerging from devices 31e are curved in on themselves when they pass under the rings, as shown in FIG. 2. The edge of disk 6 has a large number of small holes 61 which are circularly equispaced, and have typically, a diameter of about 8 mm, and through which bundles of sheathed fibers Fe emerging from devices 31e pass respectively the underside of the disk. Each bundle typically comprises 15 fibers, and the fibers Fe emerging from a device 31e are distributed into three bundles as shown in the illustrated embodiment. The fibers Fe are then curved towards the box bottom 13 to pass under the lower ring $4_1$ and are held in several layers of 10 fibers by flanges 62e. For example, each of flanges 62e comprises an assembly of two stacked bars with transverse splines.

As shown in FIG. 5, the arrays of fibers Fe are coiled around connection region CO in concentric spare loops Le. Each of the arrays is coiled at least around one loop before being inserted in the first ends 5e of respective neighbouring connectors 5 located outside the rings $4_1$, $4_2$ and $4_3$. The fibers Fe emerging from all the spreading devices 31e and slipped into individual protective jackets are practically all equal length, which implies that they can be easily prepared before routing on either side of the connection region CO and inserting into the connectors. In particular, this enables that the ends of fibers Fe can be fitted with connector end-pieces 5e when the fibers are grouped into bundles above the holes 61 of distribution disk 6.

Loops Le enable to have extra fiber lengths available in case of any incident. In the event of an incident on a fiber Fe, the length of the end portion of the fiber Fe to be withdrawn, required by the replacement of the end-piece 5e of the connector, is taken up by modifying the path of the fiber from a connector 5 to a connector 5' as shown in FIG. 5, the circumferential path of the fiber Fe around region CO remaining unchanged.

Figure 6:
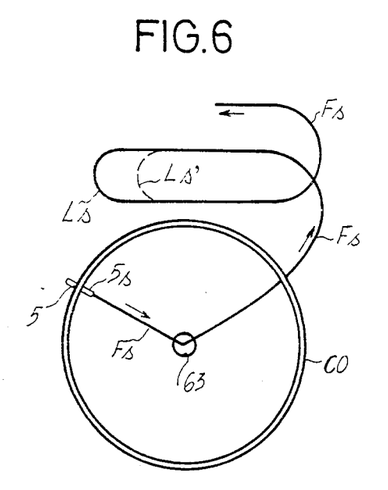
FIG. 6 is a schematic view showing coiling of an outgoing fiber towards a first end of a connector in the equipment of FIG. 1 and release of its length in the event of an incident.
Figure 7:
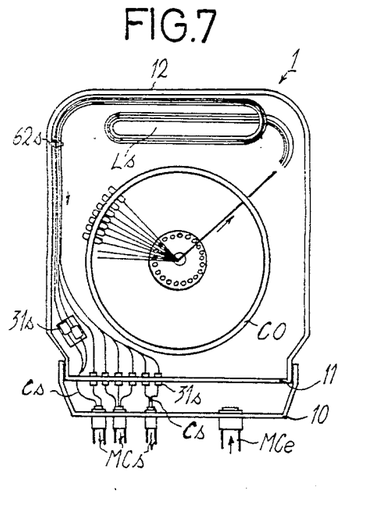
FIG. 7 is a schematic view similar to FIG. 1, and shows the paths of outgoing fibers between second ends of connectors and respective spreading devices.

With reference to FIGS. 6 and 7, the outgoing fibers Fs spread in the spreading devices 31s, that are located on the left-hand side of wall 11 and/or in front of wall 11 as shown in the illustrated embodiment, are grouped in superposed flat arrays of 10 or more fibers. using flanges 62s, and pass over the bottom 13 of the box, bypassing the connection region CO in the direction of the coiling region adjacent to the sidewall 12. In this coiling region, each array is coiled into an oblong loop Ls crosswise to the box, surrounded by ribs, or studs, on the bottom of the box. According to other embodiments of the equipment, the loops Ls are held in this compartment formed between plates spaced and stacked on the bottom 13 of the box. The arrays of fibers Fs then pass under the lower ring $4_1$ to extend radially towards the central axis of region CO. To the vertical of a large flared hole 63 located in the center of the distribution disk 6 and typically having a dismeter of about 3 cm, fibers Fs protected by their protective jacket rise back to the top of the disk and are curved and deployed in an "umbrella" before being inserted with the end-pieces 5s into the respective connectors 5. Typically, the length of the fibers in the protective jackets, between devices 31s and connectors 5, is about 3 meters.

Fibers Fs are thus grouped in hole 63 which is coaxial with rings $4_1$ to $4_3$ and located at mid-height in the set of rings, thus ensuring that the lengths of the fibers Fs between hole 63 and connectors 5 is appreciably the same and in a constant ratio with the mean radius of the rings. The two-by-two connections of fibers Fs and Fe can be chosen and modified without pulling fibers Fe and Fs, which in prior art techniques were subjected to undesirable pulling, bending and tangling, since the end-piece 5s of a fiber Fs or more generally the end of a fiber Fs can be inserted into any connector 5 on the rings by describing an arc of circle around hole 63 without tangling the fibers. The stacking of the rings in parallel tranverse sections of a cone frustum or spherical cap means that access is easy to the ends of the connectors located inside the rings, including lower ring $4_1$. The sliding of bases 51 of connectors 5 on slides 41 on the rings allows the connectors to be moved away on each side of the connector to be used for the connection, thus providing easy access.

In practice, the incoming fibers Fe are for example transmission mediums leading from a videocommunication station or automatic switching unit and have their ends plugged into any connectors which are marked once and for all. However, the outgoing fibers Fs are generally intended to serve subscriber equipments and their number varies according to operational requirements and geographical grouping of the subscribers. The mixing of fibers to connect a fiber Fs to a fiber Fe is done on the outgoing fibers by removing the end-piece 5s of fiber Fs from a connector and inserting the end-piece in the end of another connector, without modifying in any way the routing and coiling of fibers Fe and Fs.

In the event of an incident on a connector 5, the length of the corresponding outgoing fiber Fs, useful for making a new connection with another end-piece 5s, is released by pulling out the length of fiber required from the corresponding coiled loop Ls in order to form a new coiled loop Ls', as shown in FIG. 6.

Although the invention has been described above with reference to a preferred embodiment of the invention, other embodiments within the scope of the invention can be deduced from it, in dependance on the capacity of the incoming and outgoing cables. A few other embodiments are described below.

With the above-described equipment having a capacity of 210 optical fibers, it is possible to connect incoming optical fibers Fe, for example emerging from :

an incoming multiple cable comprising seven incoming sub-cables each having a ring with ten grooves, each of the grooves containing 3 fibers, as illustrated in FIG. 1; or two 90-optical fiber incoming multiple cables, each comprising three sub-cables as defined above, and one incoming cable similar to a sub-cable having 30 optical fibers, or two 90-optical fiber incoming multiple cables and three incoming cables each comprising a ring with ten grooves, each of which contains one optical fiber;

with outgoing optical fibers Fs emerging for example from:

two 90-optical fiber outgoing multiple cables and three outgoing cables each having ten optical fibers; or combinations of outgoing cables each having 5, 10, 15, 20, 25 or 30 fibers.

When the number of incoming and/or outgoing cables is high, devices 31s and/or 31e are then attached by brackets to the bottom 13 of box 1, close to the longitudinal walls 14 of the box and the distribution disk 6, as shown in short dotted lines in FIG. 1.

In other embodiments are only provided two stacked concentric rings each equipped with 105 sliding connectors, or only one ring is provided having a large diameter and equipped with 210 sliding connectors.

Figure 8:
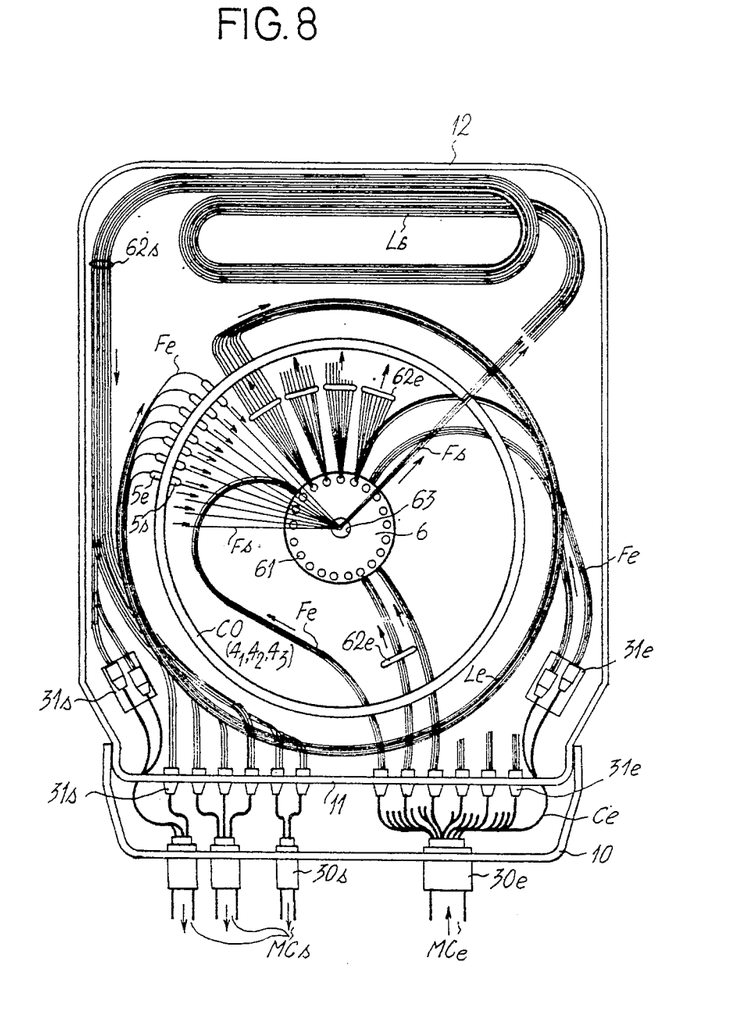
FIG. 8 is a top view of an equipment similar to that shown in FIG. 1, and shows a version of the layout of the incoming optical fiber spreading devices.

According to another embodiment of an equipment for 210 fibers illustrated in FIG. 8, the incoming sub-cables Ce have the cut grooved ring ends cut ring inserted into spreading devices 31e which are respectively attached in and in front of inner wall 11. This layout, similar to that of spreading devices 31s, allows to reduce the length of the rings in the incoming sub-cables and thus to free the internal volume of box 1 for coiling fibers.

Figure 9:
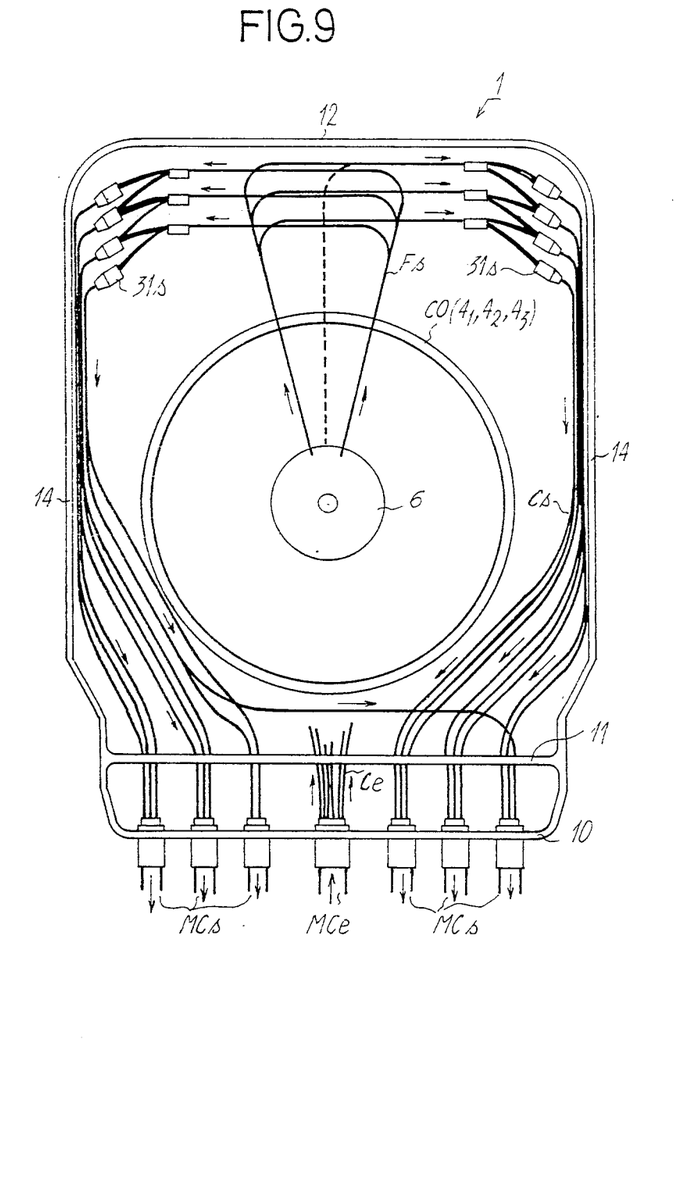
FIG. 9 is a top view of an equipment similar to that shown in FIG. 1, and shows another version of the layout of the outgoing optical fibers.

According to another version of the layout of outgoing fibers Fs shown in FIG. 9, fiber spreading devices 31s are housed in two corners of box 1 adjacent to sidewall 12 opposite sidewall 11 through which the outgoing sub-cables Cs pass. In this case, the outgoing sub-cables Cs route along the longitudinal walls 14 of the box, and the outgoing fibers Fs extend parallel to the transverse sidewall 12 from device 31s and then radially in the direction of the central hole 63 of distribution disk 6. The length of the outgoing fibers Fs in their protective jacket is thus reduced.

Figures 10, 13:
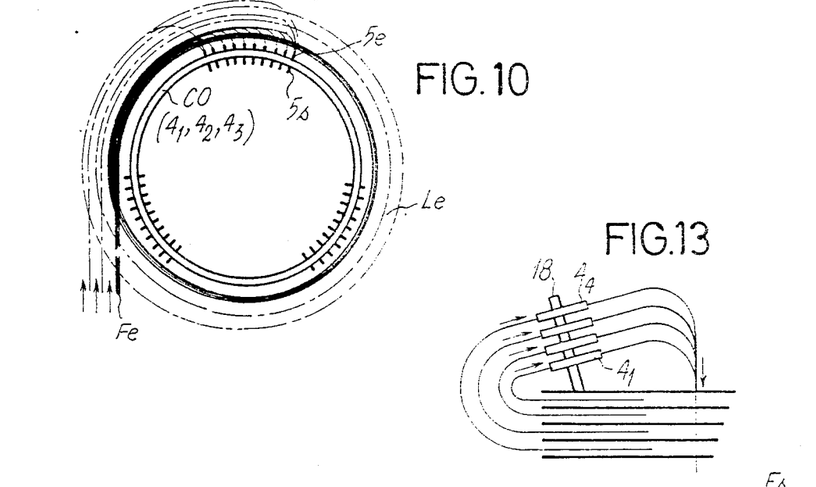
FIG. 10 is a schematic top view of a central circular region for connection and coiling, and shows a version of the layout of the incoming fibers.
FIG. 13 is a schematic transverse view similar to FIG. 11 and concerning the embodiment of FIG. 12.
Figure 11:
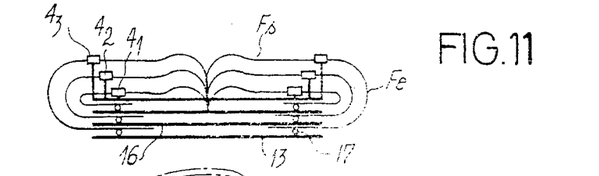
FIG. 11 is a schematic transverse view showing superposition loops of coiled incoming fibers as shown in the version in FIG. 10.

According to another embodiment for coiling the incoming fibers Fe shown in FIG. 10, after passing through wall 11, the incoming fibers are directly coiled around connection region CO into concentric loops whose diameters exceed that of rings $4_1$ to $4_3$, without passing through region CO. Preferably. as shown in FIG. 11, the coiled loops of outgoing fibers are distributed in arrays in circular stacked compartments formed between plates 16 or ring members attached to small pillars 17 fixed to the bottom 13 and under the stacked rings $4_1$ to $4_3$. In the event of an incident, the needed outgoing fiber length is released by reducing the winding diameter of the portion of coiled fiber included in the respective compartment.

Figure 12:
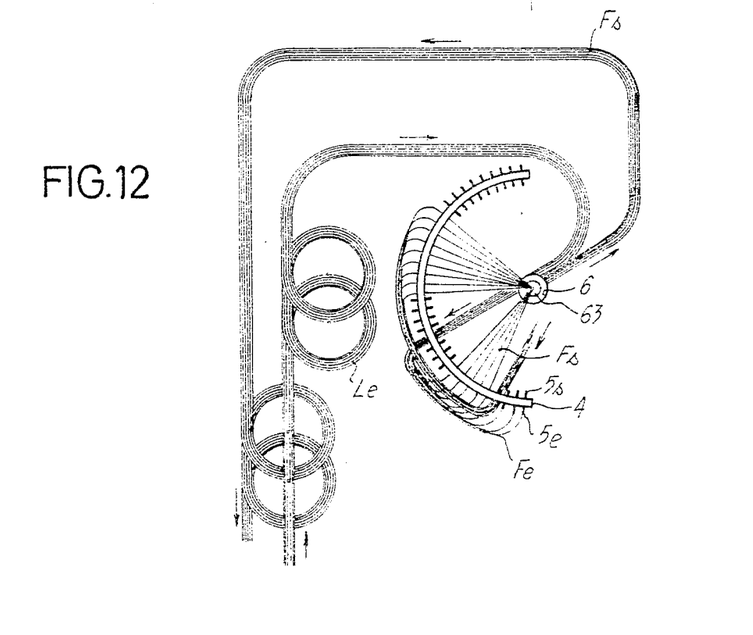
FIG. 12 is a schematic top view of an equipment having a relatively low capacity according to another embodiment.

According to second embodiments for equipments having a smaller capacity, for example 30 to 90 optical fibers, one or the rings is replaced by one or more stacked concentric slides 4 shaped in an arc of circle, such as a half-circle, as shown in FIGS. 12 and 13. The outgoing fibers Fs are then spread out in the circular sectors of the slides, after passing through the hole 63 of the central distribution disk 6. The outgoing fibers Fs and incoming fibers Fe can be coiled in small circular loops Ls and Le before turning round the slides in the direction of the center, although these coiled loops are not necessary if care is taken to route the fibers from their respective spreading devices along a fairly long detour in the direction of the center of the slides.

In another embodiment, the equipment may comprises several slides in concentric coplanar arcs of circle; for example, the equipment comprises two diametrically opposed quarter-circle slides, or three identical sixth-of-circle slides spaced two-by-two one sixth of a circle apart. The spaces between the ends opposite the neighbouring slides make it easier to access the outgoing fiber end-pieces 5s.

What we claim is:

1. An equipment for connecting first optical fibers emerging from first cables to second optical fibers emerging from second cables, comprising
    (a) plural fiber-to-fiber connectors, each of said connectors having a first connector end in which an end of a respective first fiber is inserted and a second connector end in which an end of a respective second fiber is inserted, thereby aligning and abutting said ends of said respective first and second fibers longitudinally to said connector; and
    (b) holding means having a circular structure with respect to a central axis for holding said connectors;
    (c) said first and second ends of each of said connectors being located on outer and inner peripheral circular edges of said circular structure, respectively, and being aligned radially relative to said circular structure, said ends of said second optical fibers being deployed radially from said central axis to said second connector ends, respectively.

2. The equipment claimed in claim 1, wherein said holding means comprises at least one circular slide that is concentric to said central axis and on which said connectors are slidably mounted.

3. The equipment claimed in claim 2, wherein said slide comprises means for braking sliding motions of said connectors and immobilizing said connectors in any given positions on said slide.

4. The equipment claimed in claim 3, wherein said bracking means comprises an elastic ring concentric with and included in said slide and in contact with said connectors.

5. An equipment as claimed in claim 1, comprising means for grouping together said second optical fibers emerging from said second cables in the vicinity of said central axis of said circular structure.

6. The equipment claimed in claim 5, wherein said grouping means comprises a disk coaxial with said circular structure and centrally crossed by said second optical fibers.

7. An equipment as claimed in claim 1, comprising means for grouping said first optical fibers emerging from said first cables into bundles around said central axis of said circular structure.

8. The equipment claimed in claim 7, wherein said grouping means comprises a disk coaxial with said circular structure and containing holes spread around the periphery thereof, said first optical fiber bundles passing through said holes.

9. An equipment as claimed in claim 1, comprising means located inside a sector defined by said circular structure for fanning-out said first fibers emerging from said first cables, means for grouping together the first fanned-out fibers into fiber bundles distributed around said central axis of said circular structure, and means for holding said bundles of said first fibers in arrays of coiled loops concentrically surrounding said circular structure and having ends respectively inserted in said first ends of said connectors.

10. An equipment as claimed in claim 1, comprising means located outside a sector defined by said circular structure for fanning-out said first fibers emerging from said first cables, means for grouping together the first fanned-out fibers into fiber bundles distributed around said central axis of said circular structure, and means for holding said bundles of said first fibers in arrays of coiled loops concentrically surrounding said circular structure and having ends respectively inserted in said first ends of said connectors.

11. An equipment as claimed in claim 1, comprising means located outside a sector defined by said circular structure for fanning-out said first fibers emerging from said first cables, and means for holding said first fanned-out fibers in arrays of coiled loops concentrically surrounding said circular structure and having ends respectively inserted in said first ends of said connectors.

12. An equipment claimed in claim 1, comprising means located outside a sector defined by said circular structure for fanning-out said second fibers emerging from said second cables, means located outside said structure sector for holding said second fibers in arrays of coiled loops, and means for grouping together the ends of the second coiled fibers close to said central axis of said circular structure.

13. The equipment as claimed in claim 1, wherein portions of said fibers between the location at which they emerge from said cables and the point at which they enter said ends of said connectors are protected by individual protective jackets.

14. An equipment as claimed in 1, comprising first means located inside a sector defined by said circular structure for fanning-out first fibers emerging from said first cables, first means for grouping together the first fanned-out fibers into fiber bundles distributed around said central axis of said circular structure, first means for holding said bundles of said first fibers in arrays of coiled loops concentrically surrounding said circular structure and having ends respectively inserted in said first ends of said connectors, second means located outside said structure sector for fanning-out said second fibers emerging from said second cables, second means located outside said structure sector for holding said second fibers in arrays of coiled loops, and second means for grouping together the ends of the second coiled fibers close to said central axis of said circular structure.

15. A distributing box for connecting first optical fibers emerging from first optical cables to second optical fibers emerging from second optical cables, respectively, said box comprising
(a) plural fiber connectors each connecting an end of one of said first fibers to an end of one of said second fibers,
(b) at least one circular slide disposed above a bottom of said box, said connectors being slidably mounted on said slide and disposed transversely and radially to said slide,
(c) first means for fanning-out said first optical fibers emerging said first cables, whereby said first fanned-out optical fibers successively route substantially from a central axis of said slide, run between said bottom of said box and said slide, are coiled into spare loops around a circular sector defined by said slide and have ends respectively inserted into said first ends of said connectors located on an outer edge of said slide, and
(d) second means for fanning-out said second optical fibers emerging from said second cables, whereby said second fanned-out optical fibers successively are coiled in spare loops outside said circular sector, run between said box bottom and said slide substantially toward said central axis of said slide, are deployed radially from said central axis and have ends, respectively, inserted into said second ends of said connectors located on an inner edge of said slide.

16. The equipment claimed in claim 1, wherein said circular structure of said holding means comprises several arcs of a circle along which said connectors are distributed, said arcs being concentric to said central axis and being partly stacked and partly coplanar therebetween.

17. The equipment claimed in claim 1, wherein said circular structure of said holding means comprises several arcs of a circle along which said connectors are distributed, said arcs being concentric to said central axis and forming circular parts of parallel transverse sections of a revolution surface coaxial with said central axis.

* * * * *